June 24, 1958 — R. LUCIEN — 2,840,715
INERTIA FLY-WHEEL DEVICE FOR THE AUTOMATIC
CONTROL OF BRAKING OF A WHEEL
Filed April 23, 1956 — 2 Sheets-Sheet 1

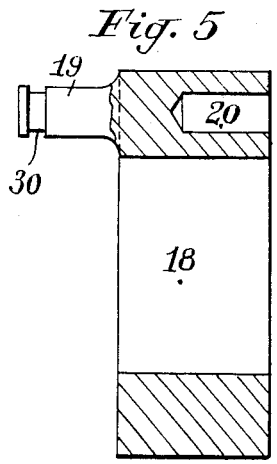
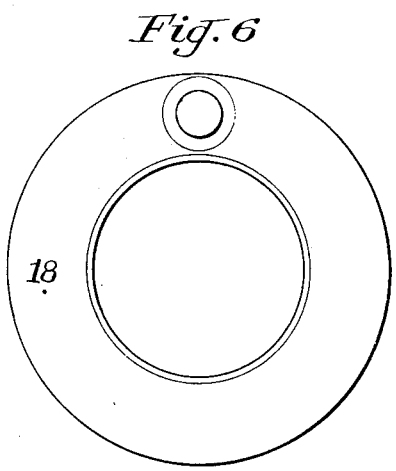
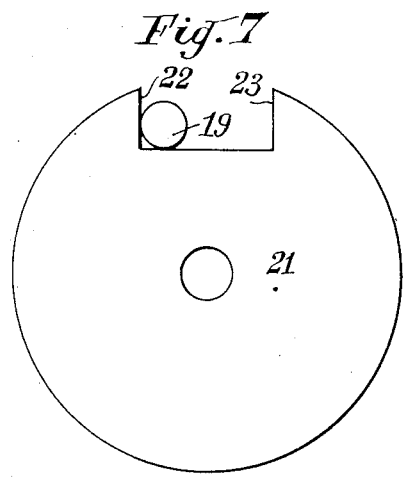
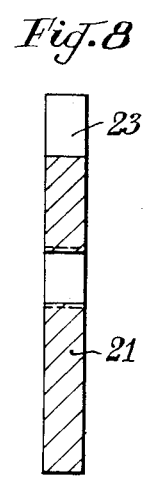
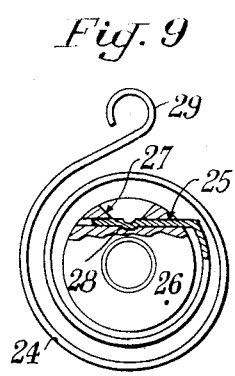

United States Patent Office 2,840,715
Patented June 24, 1958

2,840,715

INERTIA FLY-WHEEL DEVICE FOR THE AUTOMATIC CONTROL OF BRAKING OF A WHEEL

Rene Lucien, Neuilly sur Seine, France, assignor to Societe a Responsabilite Limitee Recherches-Etudes-Production R. E. P., Paris, France, a corporation of France Application April 23, 1956, Serial No. 580,120

Claims priority, application France March 13, 1956

8 Claims. (Cl. 200—61.46)

In order to avoid the locking of a wheel of a vehicle when the braking force applied to the wheel by means of a fluid under pressure exceeds the limit of adhesion of the wheel to the ground, it is known to employ devices comprising an inertia fly-wheel rotatably driven by a rotating shaft moving with the wheel but capable of an angular displacement with respect to the shaft against the action of a pre-stressed spring when the wheel is decelerated too rapidly, the device being provided with electric-contact means by friction against the fly-wheel in order to close or open an electric circuit of an electro-valve through which passes the fluid under pressure, in dependence of the respective angular position of the said shaft and of the said fly-wheel, so as to interrupt or re-establish the pressure of the fluid on the brake.

The invention has for its object a device of this kind designed with a view to great simplicity of construction, a minimum cost price, and having means of adjustment which are readily accessible.

One form of embodiment of the device in accordance with the invention is described below by way of example only and without any implied limitation, reference being made to the attached drawings in which:

Figs. 5 and 6 are views in elevation and in cross-section of the inertia fly-wheel.

Figs. 7 and 8 are views in elevation and in cross-section of a disc.

Fig. 9 is a view of the mounting of the spiral spring.

Figure 1:
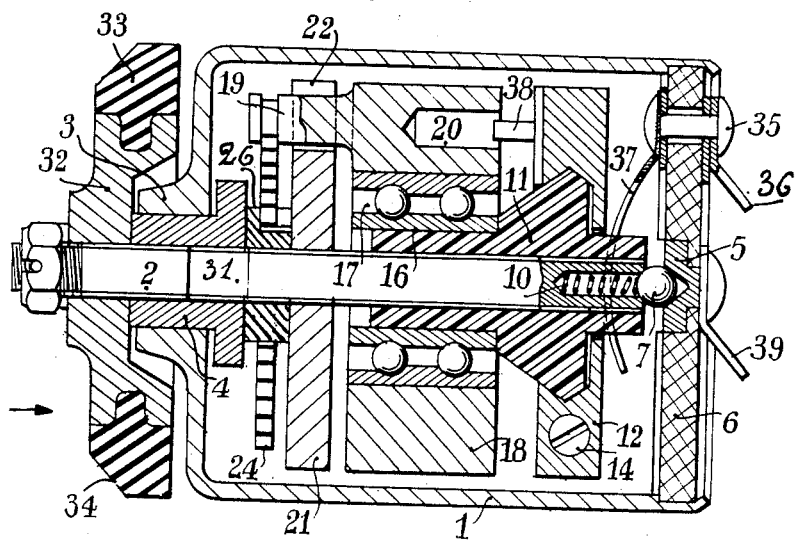
Fig. 1 is an axial cross-section of the device.
Figure 2:
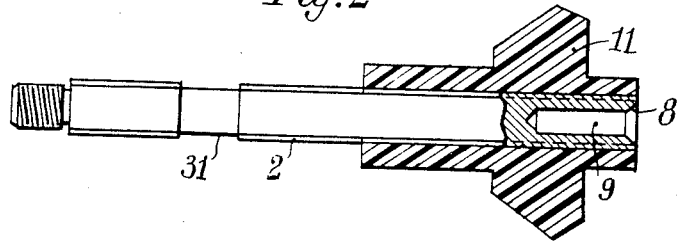
Fig. 2 is a view of the driving shaft.
Figure 3:
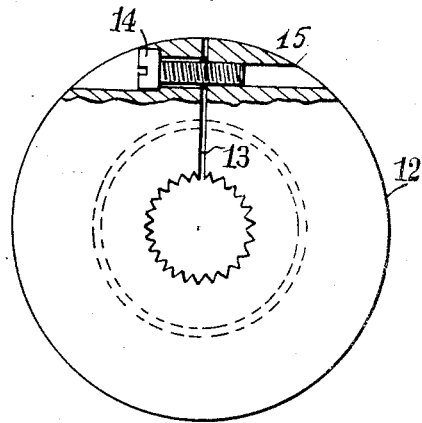
Figs. 3 and 4 are views of the collector in elevation and in cross-section.
Figure 4:
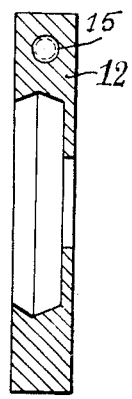

The apparatus comprises a casing 1, of cast metal or of drawn steel, through which passes a fluted shaft 2 rotating in a bearing 3 of the casing through the intermediary of a ring 4, formed internally with flutings corresponding to those of the shaft 2 and engaged on the said shaft. The ring 4 thus turns with the shaft 2 and is made of self-lubricating calcined bronze. At its other extremity, the shaft is supported by a metal footstep bearing 5—housed in a non-conducting closure plate 6— and the pivot of which is formed by a ball 7 which has as its seating a chamfer 8 formed at the extremity of the shaft on the edge of a cylindrical cavity 9 in which is housed a compression spring 10.

Around the shaft 2 has been moulded a member 11 of insulating material which is made fast for rotation by the flutes or splines of the shaft 2 and which is mounted inside a metal collector 12, in calcined bronze for example, in which the member 11 is imprisoned by reason of the double conical internal form of the collector 12. The latter is split along a radius at 13 and it is tightened so as to grip the member 11 by means of a screw 14 engaged in a screwed hole 15 so as to bring together the two edges of the slit 13. The collector 12 is thus fast for rotation with the insulating member 11 and, in consequence, with the shaft 2. Around the cylindrical part 16 of the member 11 an inertia fly-wheel 18 is movable in rotation by means of a bearing 17 having two rows of balls. This fly-wheel (see Figs. 5 and 6) is a conductor of electricity and is made for example of calcined carbide (cupro-tungsten). It is provided with a nipple 19 and has a cavity 20 on its opposite face formed by the removal of a mass of metal corresponding to that of the nipple 19 so that the fly-wheel 18 is balanced about its axis.

On the shaft 2, a disc 21 (see Figs. 7 and 8) is locked by means of splines as for the ring 2, the disc being of sheet steel and having a slot in which the nipple 19 is engaged, the edges 22, 23 of which limit the relative angular movement of the fly-wheel 18 and the disc 21. A spirial spring 24 which is an electrical conductor, for example of glucinum bronze, is engaged by its internal extremity 25 in a ring 26. This latter ring has a slot 27 in the form of a V, and the extremity 25 of the spring has an angled portion 28 which is held in the point of the V. The other end of the spring terminates in the shape of a loop 29 which is engaged around a cylindrical portion 30 turned down in the nipple 19 or formed during calcining.

The spring 24 is always in the stressed state. The initial stress is varied by the fixing of the ring 26 on the shaft 2. For this purpose, the shaft 2 has a portion 31 free of splines along a part of its length at least equal to the thickness of the ring 26 and in the vicinity of the normal position of this ring. In order to vary the stress of the spring, it is only necessary during assembly to bring the ring 26 opposite the portion 31 of the shaft 2 and to rotate the ring in the direction which stresses the spring until the desired amount of stress has been obtained, after which the ring is replaced in its normal position.

The shaft 2 is driven in rotation by the wheel of the vehicle by means of a pulley 32, for example in calcined iron or moulded "zamac" alloy, in the groove of which is fitted a ring 33 of rubber which is in contact by its chamfered portion 34 against the driving member of the wheel.

It only now remains to be shown how the closure of the electric contact is effected which actuates the electro-valve when the deceleration of the wheel reaches a pre-determined limiting value, and conversely, how the breaking of the current is effected when the wheel is either accelerating at a uniform speed or is decelerating at a rate less than the limiting value.

On the insulating plate 6 there are fixed by means of a rivet 35, an external conducting lug 36, which forms the input terminal for the current in circuit with the electro-valve, and an internal electrically conducting fork 37, the two arms of which embrace the extremity of the insulating member 11 and rub against the collector 12 which is driven in rotation by the shaft 2. The left-hand face of the collector carries a spring blade 38 which is suitably bent at its free end so as to rub against the corresponding flat face of the fly-wheel 18 when these two members are relatively displaced with respect to each other.

Due to the effect of the stress of the spiral spring 24, the nipple 19, when at rest, is in abutment against the edge 22 of the slot in the member 21. The spring 38 is fixed to the collector 12 in such manner that, in this position, its rubbing portion is located in the space formed by the cavity 20 and it is thus not in contact with the fly-wheel 18. Since the collector 12 is insulated by the insulating member 11, no current can pass and the electro-valve is not energised. While the wheel is rotating, this position remains the same as long as the nipple 19 is in contact with the edge 22 of the slot of the disc 21, and braking can then be carried out, the pressure of the fluid being admitted to the brake, as has already been stated, through the electro-valve which is not energised.

If, however, as a result of a too violent braking action, the fly-wheel, because of its inertia rotates faster than the disc 21, and since the collector 12 which is rigidly fixed to it also has a speed less than that of the fly-wheel, the nipple 19 leaves the edge 22 of the slot and comes into abutment against the opposite edge 23, thus increasing the stress of the spiral spring 24, the latter having of course been wound in the appropriate sense. During this movement, the spring blade 38 crosses the cavity 20 and comes into contact with the collector. The current then passes to the fly-wheel 18, the nipple 19, the ring 26, the shaft 2, the ball 7, the foot-step 5 and an outlet lug 39, which is for example connected to earth and which completes the circuit of the electro-valve. The latter is then energised and cuts-off the pressure of fluid on the brake which frees the wheel and thus enables it to resume either an acceleration or a reduced rate of deceleration. As a result, the edge 22 of the slot again comes into contact with the nipple 19, the brake is again applied, and so on, without the wheel being able to skid at any moment if the stress of the spring 24 has been suitably adjusted.

I claim:

1. An inertia fly-wheel device of the type of accelerometers for the automatic control of the braking of a wheel, comprising a shaft rotated by the wheel, a metal collector insulated from the shaft and rigidly fixed thereto for rotation, a metallic fly-wheel freely rotatable around said shaft and insulated therefrom, a nipple on one side of said fly-wheel which defines, on the other side, a cavity, a metallic disc fixed to said shaft and having a recess for loosely engaging the nipple, a spiral spring for conducting electric current and having an end fixed to said nipple and another end fixed to said shaft, said spiral spring urging said nipple in said recess into contact with said metallic disc, a leaf spring fixed to the collector for extending into the cavity; and two insulated terminals for the passing of electric current, one of said terminals being connected to said collector and the second to an end of said shaft, said disc operating via said nipple to rotate said fly-wheel in synchronism with said shaft and said collector whereby said leaf spring is maintained in position in said cavity, a change in rotational speed of said shaft exceeding an amount determined by said spiral spring causing a relative movement between said fly-wheel and said collector to bring said leaf spring into contact with said fly-wheel to complete an electric circuit between said terminals.

2. An inertia fly-wheel device of the type of accelerometer for the automatic control of the braking of a wheel, comprising: a shaft driven into rotation by the wheel and provided with longitudinal splines, an insulated member moulded around a portion of said shaft, a metallic collector surrounding a portion of said metallic member and rigidly fixed thereto an electric current conducting fly-wheel angularly rotatable around a portion of said insulated member and having, on one flat face, a cavity and on another flat face a nipple, a circular disc provided with axial splines engaging the splines of said shaft and having on its periphery a recess which engages said nipple, a spiral spring having an end rigidly fixed to said shaft and another end rigidly fixed to said nipple and wound around said shaft in the direction of its rotation, a conducting leaf spring rigidly fixed to the collector for wiping the face of the fly-wheel provided with the cavity but secured to the collector to extend into the cavity when the device is at rest, an insulating plate closing an end of the casing and carrying two terminals, said terminals being one for the input current, and another for the output current, respectively connected to said collector and to said shaft.

3. A device according to claim 2 in which said cavity and said nipple are cylindrical and co-axial and in which the weight of the metal of the fly-wheel removed from the cavity is balanced by that of the nipple.

4. A device according to claim 2 in which the inner end of the spiral spring is secured to a ring having inner splines engaging the splines of the driving shaft.

5. A device according to claim 4 in which the driving shaft has a portion free of splines by means of which, on rotation of said ring, after said ring is removed from the splines of the driving shaft the adjustment of said ring may be varied relatively to said shaft to thus control the stress of the spiral spring.

6. A device according to claim 2, in which one of the terminals is connected to the collector through a fork shaped leaf spring resting against a face of said collector, the shaft defining a cylindrical cavity, comprising a helical spring in the cavity, a metallic member connected to the other terminal, and a conductive ball intermediate said helical spring and metallic member, the other terminal being connected to the driving shaft by means of said helical spiral spring and ball.

7. A device according to claim 2 in which said collector is slotted along a radius and comprises means for urging the two sides of the slot together for tightening the collector on the shaft.

8. An inertia responsive switch comprising an electrically conductive collector, an electrically conductive fly-wheel including an axially extending nipple and defining an axially extending bore both being spaced from the axis of the fly-wheel and on opposite sides thereof, an electrically conductive shaft, insulating means coaxially supporting said fly wheel and collector on said shaft, a rigid member fixable on said shaft for releasably engaging the nipple to drive said fly-wheel, a spiral spring means electrically and mechanically coupling said nipple to said shaft and urging the nipple against the rigid member, and a leaf spring connected to said collector and adapted for extending into said bore, said fly-wheel being freely rotatable on said shaft, said rigid member normally driving said fly-wheel in alignment with said collector so that said leaf spring extends into said bore, said fly-wheel being inertia responsive to overcome the urging of said spiral spring means upon a determinable deceleration of said shaft to cause said leaf spring to leave said bore and contact said fly-wheel thereby completing an electric circuit including the collector, fly-wheel, spiral spring means and shaft in series.

References Cited in the file of this patent
UNITED STATES PATENTS
2,737,550     Lucien _____ Mar. 6, 1956